May 3, 1966  R. WILLE  3,249,347
APPARATUS FOR HEAT EXCHANGE BY RADIATION
Filed Aug. 18, 1961  4 Sheets-Sheet 2
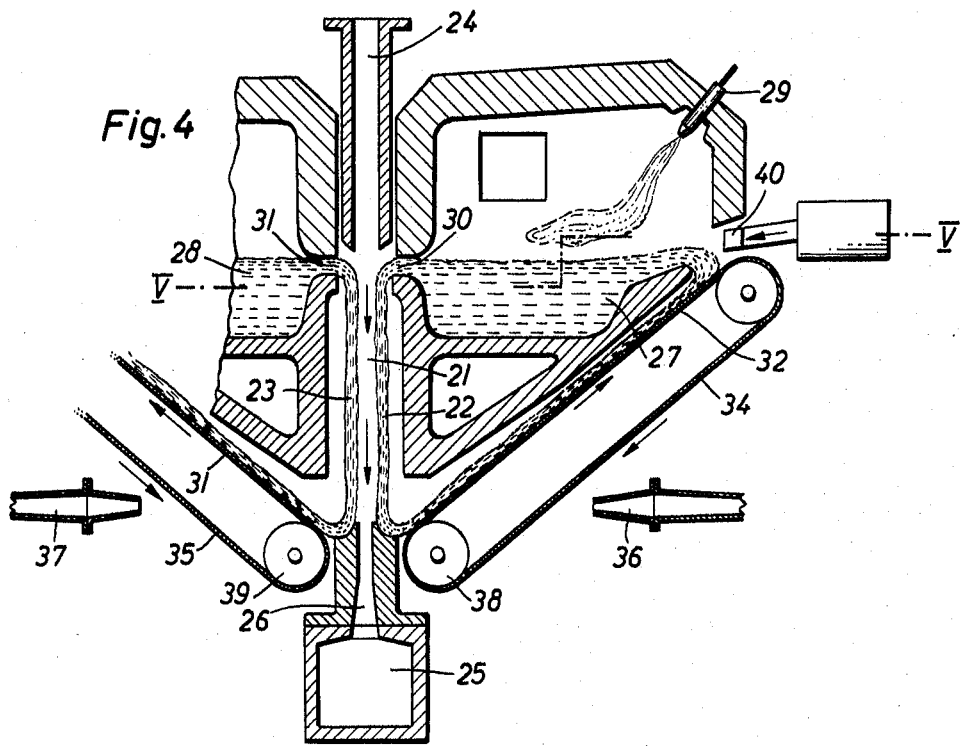
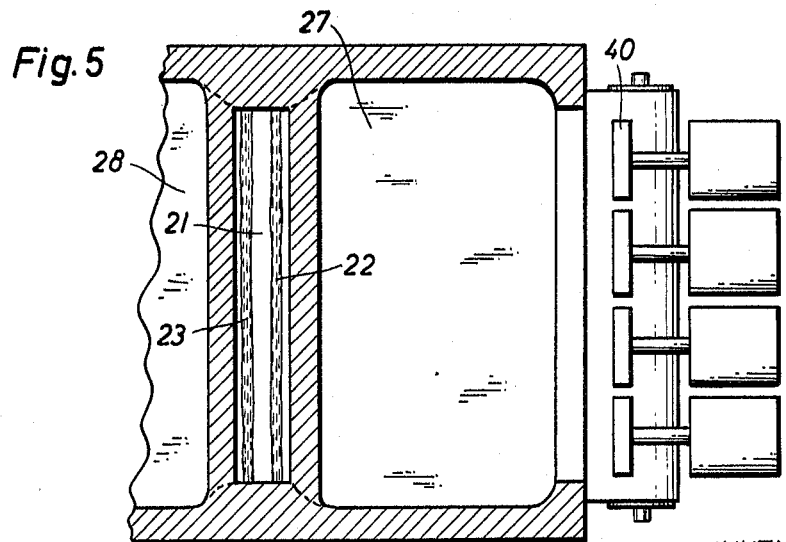
INVENTOR

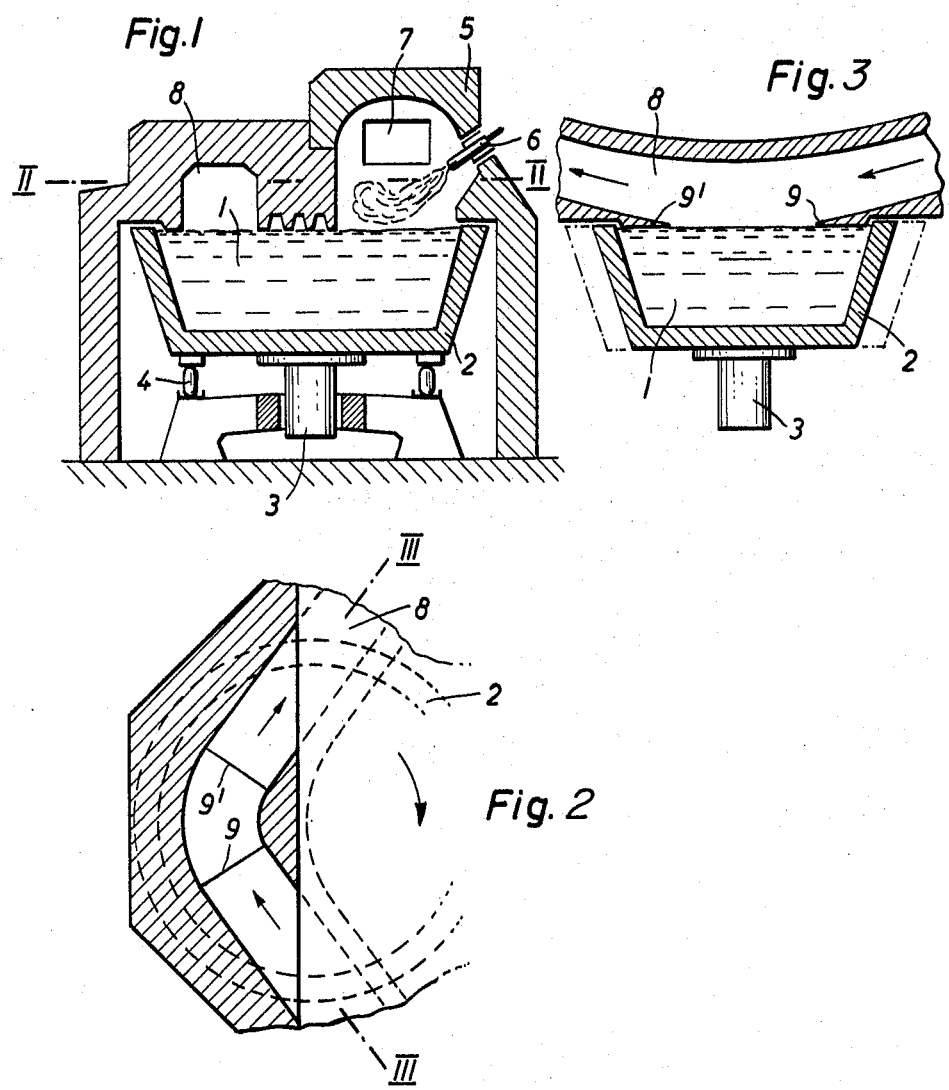

INVENTOR

May 3, 1966 R. WILLE 3,249,347
APPARATUS FOR HEAT EXCHANGE BY RADIATION
Filed Aug. 18, 1961 4 Sheets-Sheet 4
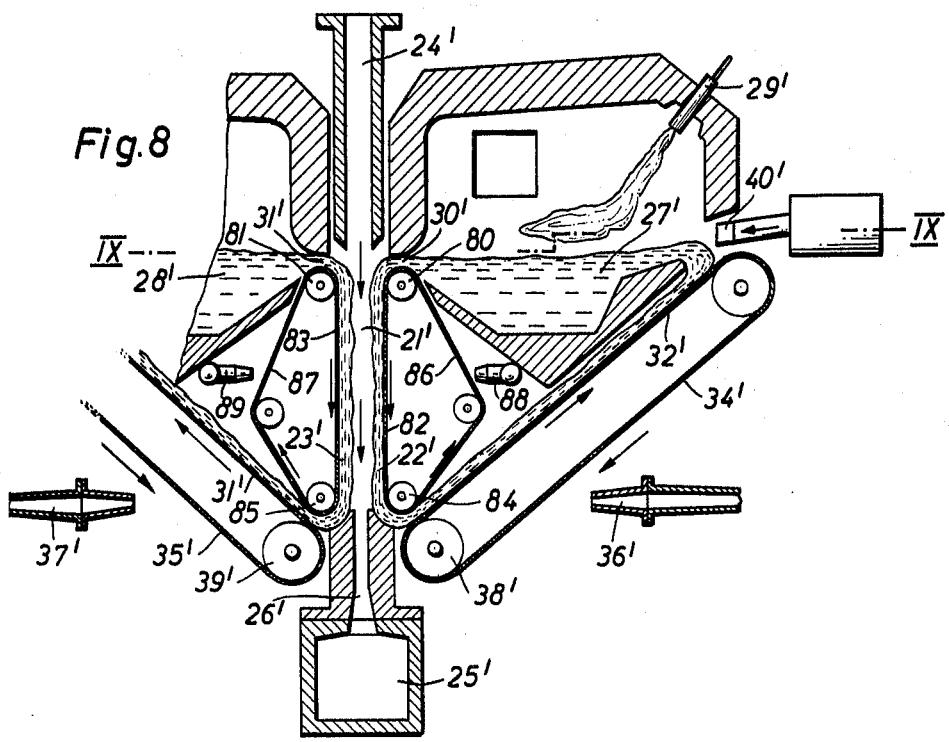
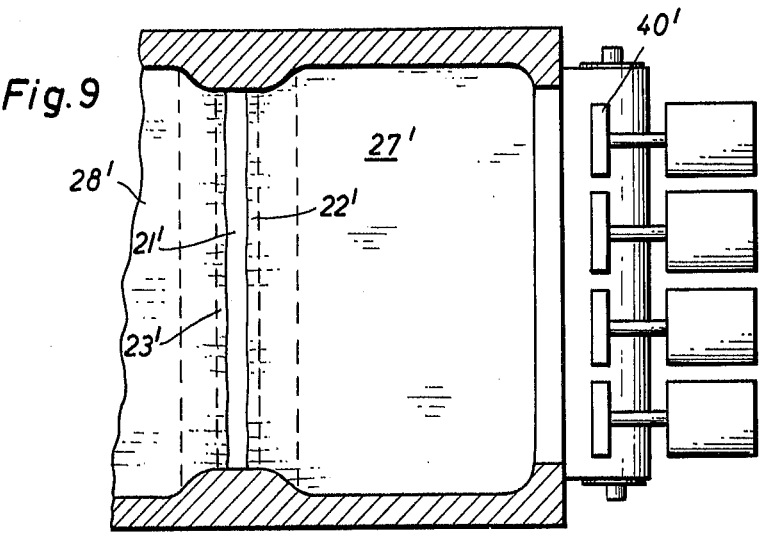
INVENTOR United States Patent Office 3,249,347
Patented May 3, 1966

3,249,347
APPARATUS FOR HEAT EXCHANGE BY RADIATION
Rudolf Wille, Freiherr-vom-Stein-Str. 11a, Berlin-Schoneberg, Germany
Filed Aug. 18, 1961, Ser. No. 132,387
1 Claim. (Cl. 261—141)

My invention relates to apparatus for heat transfer by radiation from a radiating body that is transparent and preferably used in plastic or liquid condition.

The transfer of heat from a hotter to a colder medium takes place by radiation, conduction and convection. An example is the heat exchange between a hot wall and a cold gas. When the gas is at rest or when it travels in laminar flow parallel to the wall, the heat exchange is due to radiation and conductance. When the gas is in turbulent flow, the turbulent mixing motion causes the fluid regions that travel transversely to the wall to transport heat into the colder regions. Depending upon the particular physical conditions, the proportions of radiation, conductance and convection participating in the heat exchange may differ.

In vitrually all physical or chemical processes, heat is exchanged between liquids or gases. For optimal performance along a short heat-exchanging path and within a short period of time, the participating media are caused to flow in turbulence. This is tantamount to mixing. Since the media, in most cases, must not become mixed, the heat-exchange must be effected through a partitioning wall.

Due to the insertion of a partition, which is fixed relative to the heat-exchanging media proper, there occurs a transverse gradient of the rate of change and of the temperature. This is disadvantageous for many processes, for example in the cracking of hydrocarbons, because the temperature differences in the reaction space prevent obtaining the desired chemical homogeneity of the product.

In heat exchange by radiation, the temperature of the irradiated substance adjusts itself in dependence upon its ability to absorb heat radiation. A measure therefor is the absorption coefficient of the substance. For example, when the heat radiation issues from a planar surface, then in a prismatic space whose one wall is constituted by the radiating surface, all parts that have the same absorption coefficient will assume the same temperature. Thus, radiators in which the heat issues perpendicularly to a planar surface are well suitable for uniformly heating a gas or vapor volume without causing a temperature gradient. A homogeneous temperature field, desired for many chemical processes, adjusts itself particularly if heat conductance participates in the heat exchange only to a negligible extent and if no relative motion takes place between the heat exchanging substances. For transferring large heat quantities by radiation, it is preferable to select as heat issuing material a radiation-permeable substance, so that not only the surface of the radiating substance but its volume participates in the radiation. All transparent substances, whether gaseous, liquid, plastic or solid, are suitable for such heat exchange by radiation.

A method of transferring heat by radiation from one gas to another for the purpose of cracking hydrocarbons has been proposed previously. The requirement for equal flow velocities of both gaseous media can be satisfied by suitable control or regulating devices. However, it is necessary and difficult to provide for a careful design of the ducts and channels in order to guide the two gases without disturbance beside each other and to separate them from each other after they have passed through the heat-exchanging reaction space.

It is an object of my invention to minimize or eliminate the difficulties encountered with the just-mentioned necessity for separated guidance and separation of two gaseous media.

To this end, and in accordance with a feature of my invention, I employ as the heat-issuing, radiating substance a transparent solid body, a liquid, or a plastic body which, when heated to the radiating, usually incandescent temperature, forms a distinct boundary surface relative to the gas or vapor to be heated by radiation.

The radiating substance for the purposes of my invention may consist of salt or other crystalline substance which becomes viscous or liquid at the radiating temperature, or it may consist of glass or the like vitreous material which likewise becomes more or less fluid at the radiating temperature. According to another feature of my invention, the heat radiating substance, when in heated and more or less fluid conidtion, is kept in motion and is given substantially the same speed and the same travelling direction as the gaseous medium to be radiation-heated at the boundary surface where the gaseous medium is in contact with the heat-carrier substance.

In many cases, particularly physical processes involving a heat exchange without chemical reaction, the requirement for equal speed of the contacting surfaces can be dispensed with.

According to a modification of the invention, a transparent layer can be caused to flow between the radiating heat carrier and the gaseous medium to be heated.

The above-mentioned and more specific objects, advantages and features of my invention, said features being set forth with particularity in the claims annexed hereto, will be apparent from, and will be described in, the following with reference to the accompanying drawings in which different embodiments of apparatus according to the invention are illustrated by way of example. These embodiments relate to the use of molten white glass as a heat carrier substance, employed for transferring heat to any gaseous medium, for example benzene vapor.

FIG. 1 is a vertical section through an apparatus in which the heat-carrier substance is contained in a rotary tub.

FIG. 2 is a partial and partly sectional top view of the same apparatus, the section being taken along the line II—II in FIG. 1.

FIG. 3 is a cross section along the line III—III in FIG. 2.

FIG. 4 shows schematically a vertical section through another apparatus which comprises two coactive containers for heat-carrier substance.

FIG. 5 is a schematic sectional view, the section being taken along the line V—V in FIG. 4.

FIG. 8 shows partly a sectional view of a fourth apparatus, and FIG. 9 is a horizontal section along the line IX—IX in FIG. 8.

Figure 6:
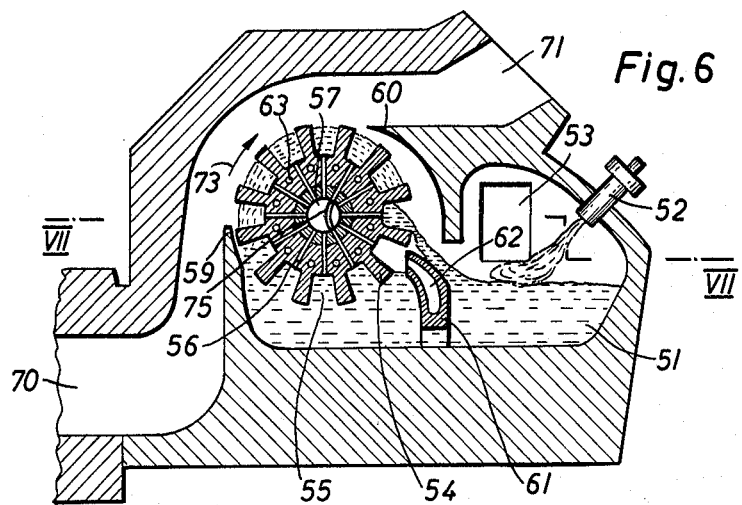
FIG. 6 is a vertical sectional view of a third apparatus.

According to FIGS. 1, 2 and 3, a melt of glass 1 is located in a circular tub 2 which rotates about the axis of its shaft 3. Rotation is imparted to the tub by means of rollers 4 of which one or more are driven by an electric motor (not shown). The tub is surrounded by an enclosure which forms a dome-shaped space above the melt. Located in the dome structure 5 of the enclosure is a heater, such as the illustrated oil burner 6, by means of which the glass is heated and kept in molten and heat-radiating condition. The combustion gases resulting from the operation of the oil burner 6 leave the dome space through a flue opening 7 from which they pass into a chimney (not shown). The gas to be heated is supplied through a channel 8 which is open toward the glass melt along the portion of the periphery not covered by the heating area beneath the dome structure. The area within which the gas is subjected to radiation from the heated melt is located between two edges 9 and 9' of the enclosure structure. In this area, the travelling direction of the melt and of the gas are coincident and the travelling speeds of both are approximately equal. For adapting the speed of the gas flow to that of the melt, the channel 8 is curved between the edges 9 and 9', thus approximately following the course travelled by the melt.

In the embodiment according to FIGS. 4 and 5, the gaseous medium to be heated is passed through a vertical channel 21 between two sheets 22 and 23 formed of a plastic transparent mass, for example molten glass. The gaseous medium is supplied through a conduit 24 from above and leaves the apparatus through a channel structure 25. The two mat-like flows 22 and 23 of the radiating substance pass downwardly upon the two legs of a guide structure between which a passage 26 conducts the heated gaseous medium from channel 21 to channel 25. The glass is kept in molten condition and at sufficiently high temperature by means of two trough-like containers 27 and 28 in which the glass is subjected to heaters, for example oil burners 29. The molten substance passes through over-flow slots 30 and 31 and over respective overflow edges, thus forming the above-described radiating tapes or mats 22 and 23. The thickness of these glass mats 22 and 23 is adjusted by adjusting the width of the slots 30 and 31. The gas velocity in the channel 21 is adapted to the downward travelling speed of the glass mats 22 and 23.

At the lower end of the radiation channel 21, the glass mats are deflected outwardly and are seized by conveyor belts 32 and 33 respectively. The conveyor belts consist of heat-resistant wire mesh. Their return runs 34 and 35 are cooled by air jets issuing from nozzles 36 and 37. The conveyor belts are driven by means of their rollers 38 and 39. The conveyor belts lift the glass back to the height of the liquid level in the melting troughs 27 and 28, where the glass is forced back into the trough by pusher devices 40.

A variation of the embodiment just described resides in a construction wherein each flow of glass, when passing out of its trough, is seized by a conveyor belt and is then passed constrainedly, rather than as a free flow, through the radiation zone at a speed adjustable by means of the just-mentioned conveyor. In all other respects, the just-mentioned variant may correspond to the embodiment described above with reference to FIGS. 4 and 5.

Figure 7:
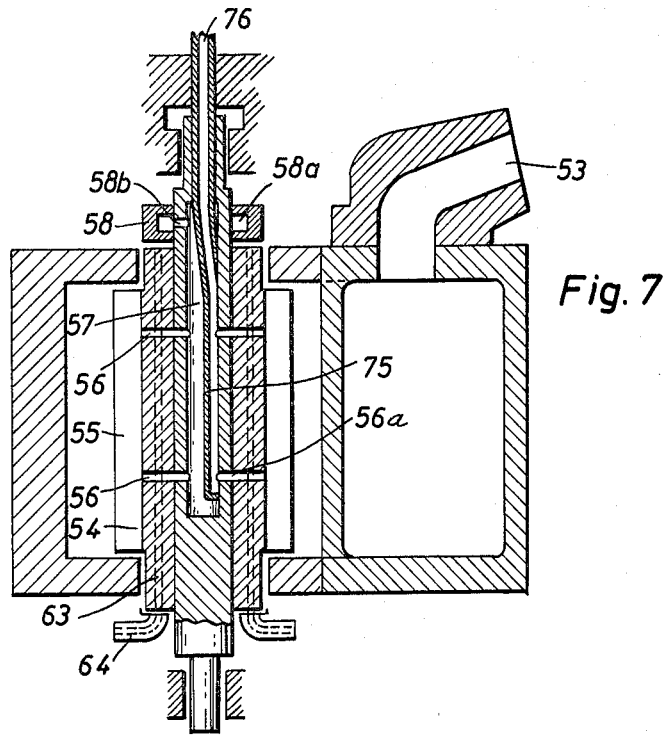
FIG. 7 is a horizontal section along the line VII—VII in FIG. 6.

In the embodiment of FIGS. 6 and 7, the radiating surface is formed by the surface of a cylindrical drum and the gaseous medium to be heated passes about one-quarter of the periphery of the radiating cylinder. In this case the law relating to the transfer of heat from radiating planar surfaces is preserved in first approximation. Used as a radiating plastic substance may be molten glass, for example.

The molten glass 51 is kept liquid in a furnace trough provided with electric resistance heaters or with oil burners such as the one denoted in FIG. 6 by 52. The combustion gases escape through a flue opening 53.

Located at one side of the melting trough is a cylindrical drum or roller 54 whose cylindrical surface is provided with a large number of peripherally distributed grooves 55 or similar recesses. When the drum is in rotation and the grooves pass sequentially through the molten bath, the grooves become filled with molten substance. For accelerating the filling operation, the grooves can be put under negative pressure by exhausting air from the grooves through channels 56 and a central bore 57. A ring-shaped, fixed collar piece 58 has its inner ring space 58a in continuous communication with the central bore 57 through a lateral opening 58b, the ring space 58b being connected with a blower or other source of negative pressure (not shown). During clockwise rotation of the roller structure in the direction of the arrow 73 (FIG. 6) the negative pressure is applied in the just-described manner to each individual groove 55 as it travels between the edges 59 and 60. When each groove travels downwardly away from edge 60, the negative pressure is discontinued, and the glass flows out of the groove and passes over a partitioning structure 61 back into the melt. The control of the negative pressure is effected by suitable control means, for example by a stationary member 75 which prevents the negative pressure in bore 57 from acting upon those of the channels 56 that, at any one time, are located at the right of member 75, and which instead connects the latter channels to the free atmosphere at 76. Thus, for example, the channel 56a in FIG. 7 is connected with the ambient air and hence not under negative pressure at the illustrated instant of operation.

After the travelling grooves become immersed into the melt, they become again filled as soon as the negative pressure commences to become active, and the circulatory path of the molten glass within the grooves again commences. The partitioning structure 61 which serves to guide the glass from the grooves back into the melt may be provided with an internal channel 62 for a flow of cooling air. A portion of the cooling air is blown from channel 62 into the grooves as they are being emptied in order to increase the useful lifetime of the roller structure. Further cooling channels 63 extend through the roller structure and communicate with a coupling piece 64 by means of which a current of cooling air can be blown through the roller.

The gas to be heated enters through a duct 70 and flows at a properly adjusted speed about the rotating roller 54 before leaving the furnace through an outlet duct 71. The speed of roller rotation is to be so adjusted that the peripheral speed at the roller surface is substantially equal to the travelling speed of the gas.

The apparatus illustrated in FIGS. 8 and 9 is in accordance with the above-mentioned modification of the one shown in FIGS. 4 and 5, the same reference numerals being applied in FIGS. 8 and 9 as in FIGS. 4 and 5 to the same components, respectively.

The molten glass to serve as heat carrier passes from the troughs 27' and 28' through respective overflow slots 30' and 31' onto downwardly travelling runs 82 and 83 of respective endless conveyor belts which pass over upper guide rollers 80, 81 and lower guide rollers 84, 85. The glass is entrained by the downward runs 82, 83 and passes through the radiation space 21'. Hence, the travel speed of the glass mass along the radiation distance can be adjusted by correspondingly adjusting the travelling speed of the conveyor belts. At the lower end of the respective conveyors, the guide rollers 84 and 85 pass the glass onto respective ascending runs 32' and 31' of two further conveyors which return the glass into the respective troughs 27' and 28'. The ascending run 86, 87 with whose aid the speed of the glass mass in the radiation space 21' is adjusted, as well as the return-travel run 34' and 35' of the conveyor belts for returning the glass mass, are preferably cooled by air jets issuing from nozzles 88 and 89. The adjustability of the glass travelling speed within the radiation space has the advantage of affording a particularly good control of the heat transfer from the glass mass onto the gas.

Ordinary colorless glass (also called "white glass") of conventional composition is particularly well suitable for the purposes of the invention. However, other diathermal, i.e. radiation-permeable, substances that are plastic at the desired elevated temperature are also applicable. For example, at relatively low temperatures, transparent synthetic plastics such as casting resins can be employed. For very high temperatures, a melt of quartz ($SiO_2$) is applicable. However, a melt of quartz, in contrast to glass and other vitreous masses, does not form a viscous and tenaciously fluid mass within a relatively wide range of temperatures but posesses a definite melting point. For that reason, it can be used in apparatus of the type illustrated in FIGS. 1 to 3, but is not readily applicable in the equipment according to the other illustrations.

Following is an example of a benzene cracking process performed with apparatus according to FIGS. 1 to 3. A melt of ordinary clear glass was heated in the apparatus to 1500° C. with the aid of the oil burner 6. A mixture of benzene vapor and steam was passed over the glass melt through the duct 8. Due to heat radiation from the glass melt, the gas mixture assumed a temperature of 750° C. resulting in cracking of the benzene vapor. The cracking heat was 300 kcal./kg. The flow velocity of the gas mixture being supplied was so chosen that a dwell time above the glass melt of approximately 0.75 second resulted. The glass melt was given the same speed as the gas mixture by correspondingly adjusting the rotating speed of the tub 2. Obtained was a heat transfer by radiation from the melt to the gas mixture in the order of about 50,000 kcal./qmh. The gas withdrawn contained predominantly ethylene and, in general had a composition similar to the gas produced by cracking of benezene in a known tubular cracking plant, except for a higher ethylene yield due to the uniform maintenance of a definite cracking temperature afforded by the invention.

While in the foregoing the invention is described with reference to embodiments in which a gaseous medium is heated from a radiating body not miscible with the gas, the essential features of the invention are also applicable to the inverse purpose of cooling a gas by radiation.

It will further be understood by those skilled in the art, upon studying this disclosure, that my invention permits of various changes with respect to the particular materials being employed as well as with respect to the design of the equipment being used, and hence can be given embodiments other than particularly illustrated and described herein, without departing from the essential features of my invention and within the scope of the claim annexed hereto.

I claim:

Apparatus for heating a gaseous medium by heat-exchange from a heat carrier, comprising a rotatable tub with a heat carrier substance contained therein, said substance being substantially fluid and transparent to heat radiation when at heat-radiating temperature, an enclosure covering said tub and forming a heating chamber above it, heating means disposed in said chamber for heating said substance in said tub to said heat-radiating temperature, said chamber extending over only part of the tub periphery, and said enclosure forming a duct at the remaining part of the tub periphery for passing the gaseous medium through the enclosure in direct contact with the heat carrier substance.

References Cited by the Examiner

UNITED STATES PATENTS

| | | | |
|---|---|---|---|
| 1,622,797 | 3/1927 | McCloskey | 261—142 |
| 2,043,647 | 6/1936 | Berven | 261—142 |
| 2,160,185 | 5/1939 | Willauer | 261—153 |
| 2,311,583 | 2/1943 | Styren | 261—153 |
| 2,545,028 | 3/1951 | Haldeman | 261—153 |
| 2,752,235 | 5/1956 | Burke | 75—60 |
| 2,862,811 | 12/1958 | Eketorp et al. | 266—36 X |
| 3,015,190 | 1/1962 | Arbeit | 261—128 |

FOREIGN PATENTS

| | | |
|---|---|---|
| 1,198,323 | 6/1959 | France. |
| 850,928 | 10/1960 | Great Britain. |

HARRY B. THORNTON, *Primary Examiner.*

R. R. WEAVER, *Assistant Examiner.*